US012696165B2

(12) United States Patent
Park et al.

(10) Patent No.: US 12,696,165 B2
(45) Date of Patent: Jul. 28, 2026

(54) MEASUREMENT IN NTN COMMUNICATION

(71) Applicant: LG ELECTRONICS INC., Seoul (KR)

(72) Inventors: Jinwoong Park, Seoul (KR); Yoonoh Yang, Seoul (KR); Jinyup Hwang, Seoul (KR); Sangwook Lee, Seoul (KR); Suhwan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 18/557,750

(22) PCT Filed: May 10, 2022

(86) PCT No.: PCT/KR2022/006664
§ 371 (c)(1),
(2) Date: Oct. 27, 2023

(87) PCT Pub. No.: WO2022/240142
PCT Pub. Date: Nov. 17, 2022

(65) Prior Publication Data
US 2024/0372608 A1       Nov. 7, 2024

(30) Foreign Application Priority Data

May 11, 2021    (KR) ........................ 10-2021-0060545
Jan. 7, 2022    (KR) ........................ 10-2022-0002997

(51) Int. Cl.
*H04W 36/32*        (2009.01)
*H04B 7/185*        (2006.01)
*H04W 74/0833*      (2024.01)
(52) U.S. Cl.
CPC ...... *H04W 36/328* (2023.05); *H04B 7/18519* (2013.01); *H04W 74/0833* (2013.01)

(58) Field of Classification Search
CPC ........... H04W 36/328; H04W 74/0833; H04W 36/0085; H04W 56/0015; H04W 24/10;
(Continued)

(56) References Cited

FOREIGN PATENT DOCUMENTS

| KR | 10-2020-0127865 | 11/2020 | |
| KR | 20200127865 A | * 11/2020 | ............ H04W 84/06 |
| WO | 2020-092561 | 5/2020 | |

OTHER PUBLICATIONS

Nokia, Nokia Shanghai Bell: "Post-[108][NTN] views on SMTC and measurement gaps", 3GPP Draft; R2-2103336, 3rd Generation Partnership Project (3GPP), Apr. 1, 2021, XP051992056.*
(Continued)

*Primary Examiner* — Marcos L Torres
(74) *Attorney, Agent, or Firm* — LEE, HONG, DEGERMAN, KANG & WAIMEY

(57)         ABSTRACT

One disclosure of the specification provides a method performed by UE. The method comprises the steps of: receiving a synchronization signal from a network; on the basis of the UE being connected to a base station via an NTN satellite, receiving, from the network, system information related to an NTN; transmitting a RACH to the network; receiving a RA response message from the network; receiving measurement information from the network, wherein the measurement information includes information regarding a measurement point in time for measurement by the UE; determining, on the basis of orbit information of a target satellite, a measurable point in time when an elevation angle of the target satellite exceeds a threshold value; on the basis of the measurement point in time being earlier than the measurable point in time, transmitting a failure message to the network; and carrying out measurement at the measurable point in time.

11 Claims, 16 Drawing Sheets

1. receiving, from a network, a synchronization signal 2. receiving, from the network, system information related to NTN 3. transmitting, to the network, RACH 4. receiving, from the network, a RA response message 5. receiving, from the network, measurement information 6. determining measurable point in time at which the altitude angle of a target satellite exceeds a threshold, based on orbital information of the target satellite 7. transmitting, to the network, a failure message, based on the measurement point being earlier than the measurable point 8. performing measurement at the measurable point

(58) Field of Classification Search
　　　CPC ............. H04W 56/0045; H04W 84/06; H04W
　　　　　　　　　36/0058; H04W 36/083; Y02D 30/70;
　　　　　　　　　　　　　H04B 7/1853; H04B 7/18519
　　　See application file for complete search history.

(56) References Cited

OTHER PUBLICATIONS

European Patent Office Application Serial No. 22807790.5, Search
Report dated Apr. 7, 2025, 13 pages.
Nokia et al., "Post-[108][NTN] views on SMTC and measurement
gaps," R2-2103336, 3GPP TSG-RAN WG2 Meeting #113bis Elec-
tronic, Apr. 2021, 7 pages.
OPPO, "Discussion on mobility management for connected mode
UE in NTN," R2-2009112, 3GPP TSG-RAN WG2 Meeting #112-e,
Electronic, Oct. 2020, 4 pages.
3rd Generation Partnership Project, "Technical Specification Group
Radio Access Network; Solutions for NR to support non-terrestrial
networks (NTN) (Release 16)," 3GPP TR 38.821 V16.0.0, Dec.
2019, 140 pages.

\* cited by examiner

FIG. 1

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 12

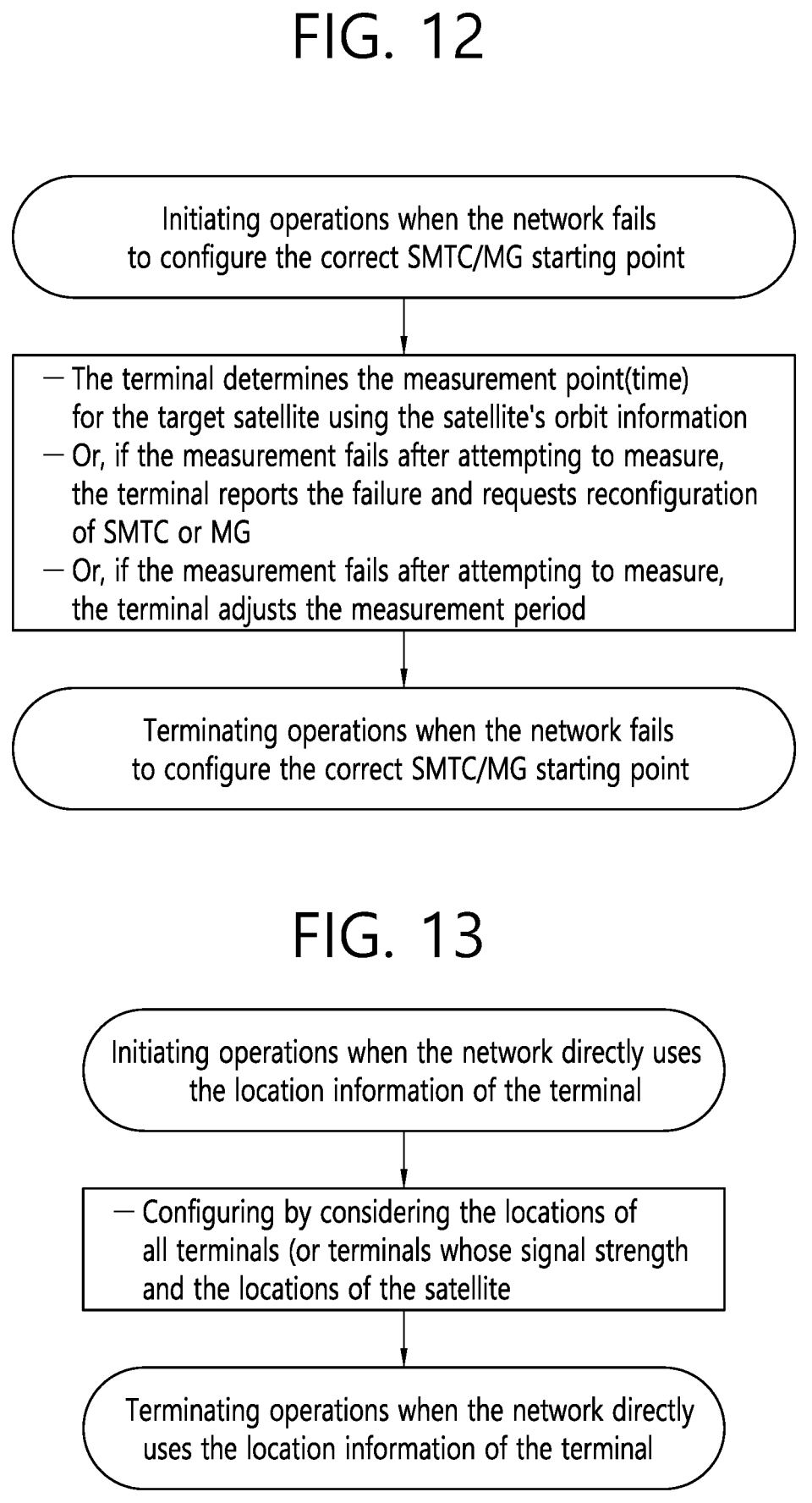

Initiating operations when the network fails
to configure the correct SMTC/MG starting point — The terminal determines the measurement point(time)
  for the target satellite using the satellite's orbit information
— Or, if the measurement fails after attempting to measure,
  the terminal reports the failure and requests reconfiguration
  of SMTC or MG
— Or, if the measurement fails after attempting to measure,
  the terminal adjusts the measurement period Terminating operations when the network fails
to configure the correct SMTC/MG starting point

FIG. 13

Initiating operations when the network directly uses
the location information of the terminal — Configuring by considering the locations of
  all terminals (or terminals whose signal strength
  and the locations of the satellite Terminating operations when the network directly
uses the location information of the terminal

MEASUREMENT IN NTN COMMUNICATION

CROSS-REFERENCE TO RELATED APPLICATIONS

This application is the National Stage filing under 35 U.S.C. 371 of International Application No. PCT/KR2022/006664, filed on May 10, 2022, which claims the benefit of earlier filing date and right of priority to Korean Application Nos. 10-2021-0060545, filed on May 11, 2021, and 10-2022-0002997 filed on Jan. 7, 2022, the contents of which are all hereby incorporated by reference herein in their entireties.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In NTN communications, a measurement method that takes into account the elevation angle of the target satellite is required.

It allows the terminal to measure when the target satellite is above a certain altitude angle.

The specification may have various effects.

For example, through the procedure disclosed in this specification, it is possible to efficiently measure the target satellite using elevation angle information, thereby preventing a decrease in system performance and saving terminal power.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 1 shows an example of a communication system to which implementations of the present disclosure is applied.

FIG. 12 shows an example of Case 1.

FIG. 13 shows an example of Case 2.

DETAILED DESCRIPTION

Figure 2:
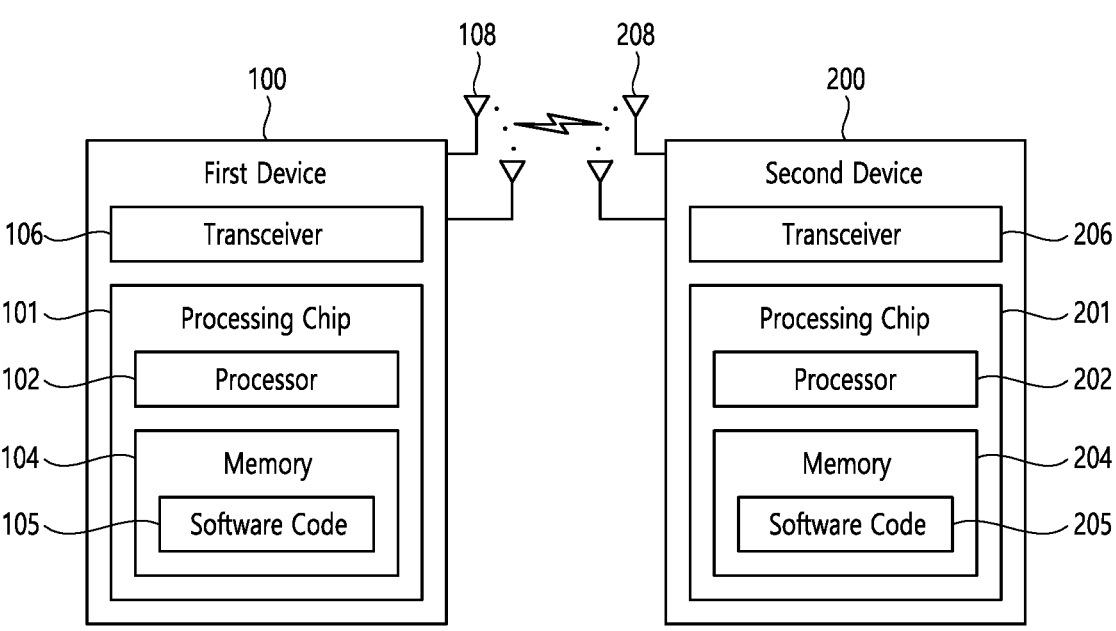
FIG. 2 shows an example of wireless devices to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
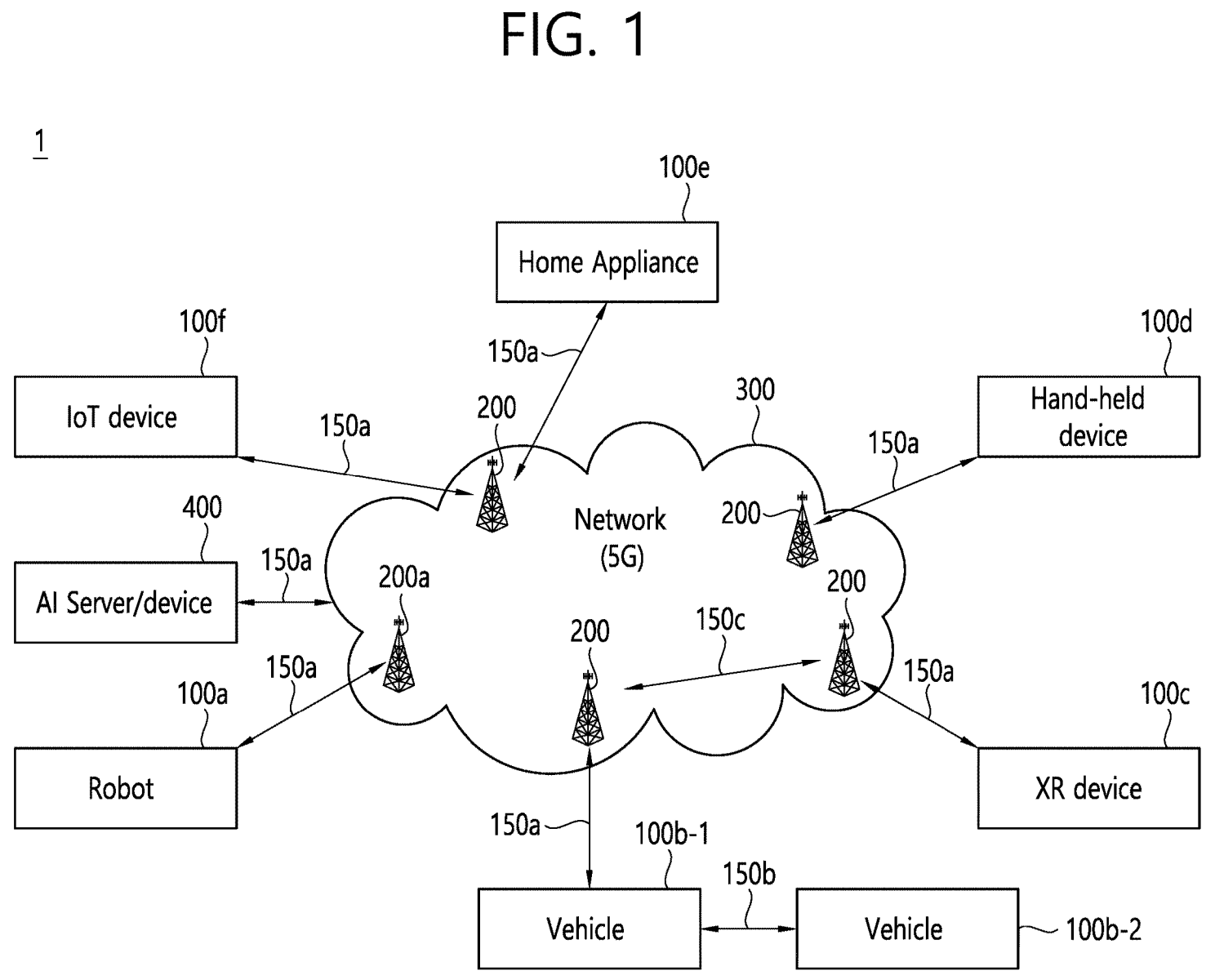

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrow band internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/ chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
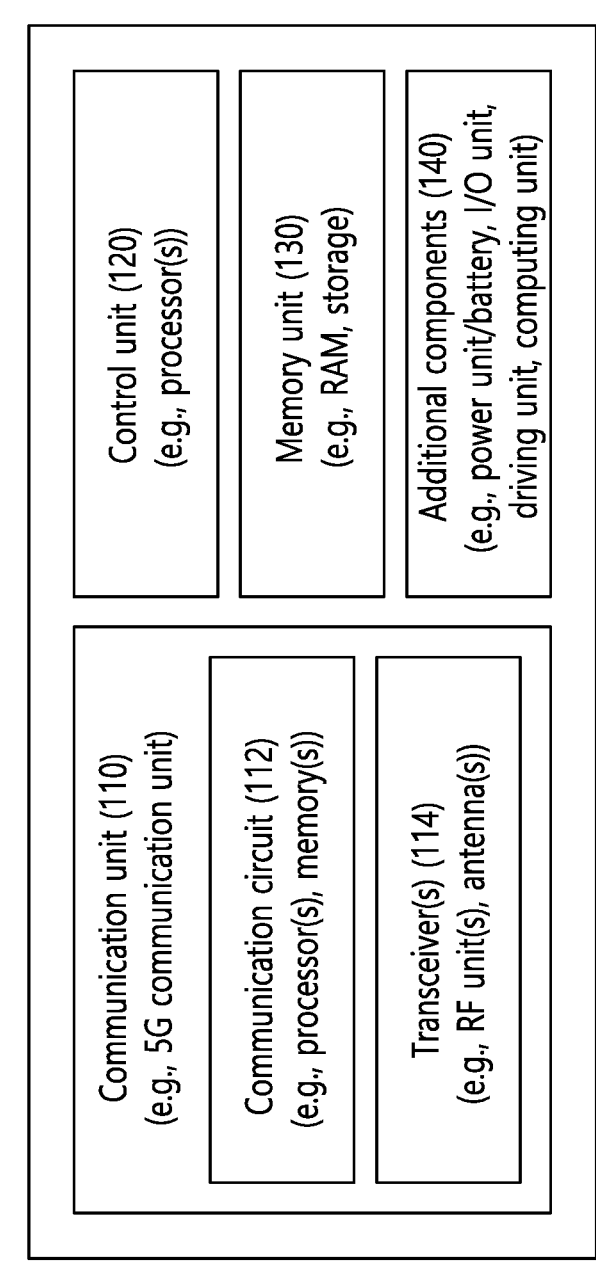
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/ portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/ mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200.

For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100_a_ of FIG. 1), the vehicles (100_b_-1 and 100_b_-2 of FIG. 1), the XR device (100_c_ of FIG. 1), the hand-held device (100_d_ of FIG. 1), the home appliance (100_e_ of FIG. 1), the IoT device (100_f_ of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
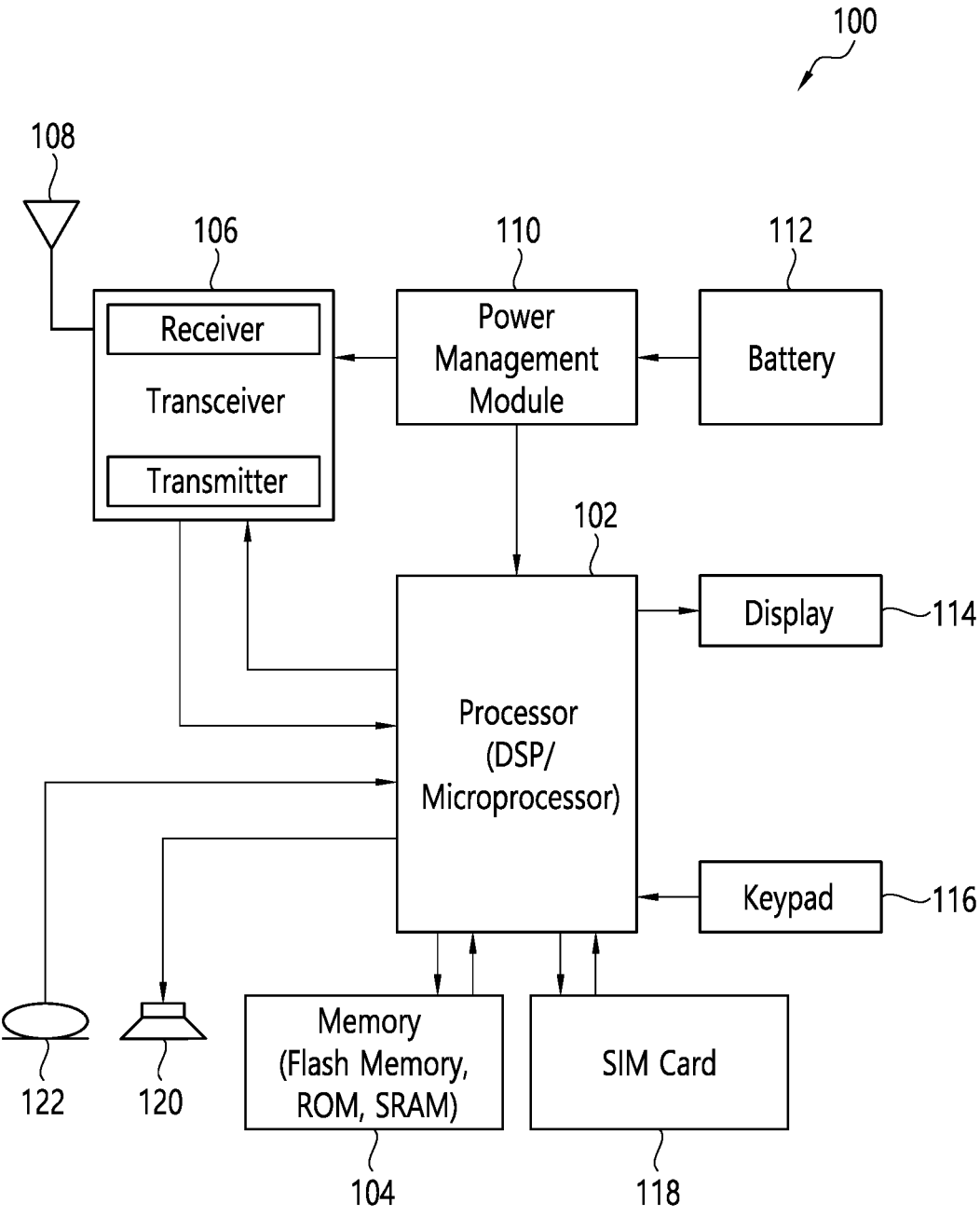
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5A:
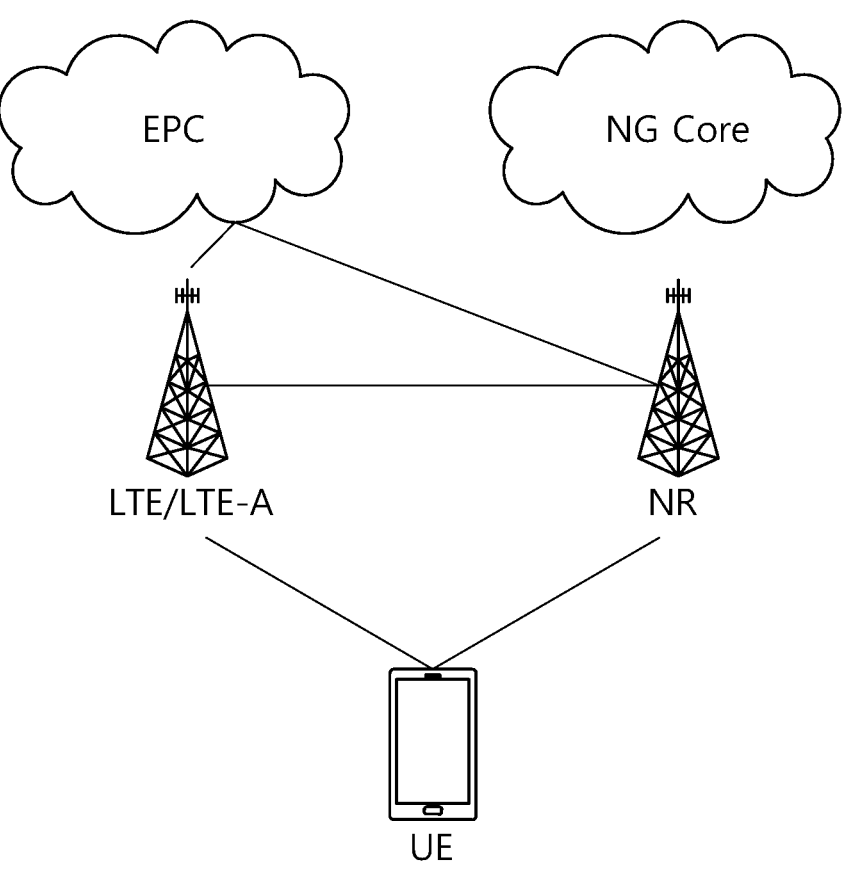
FIGS. 5a to 5c are exemplary diagrams illustrating an exemplary architecture for a service of next-generation mobile communication.
Figure 5B:
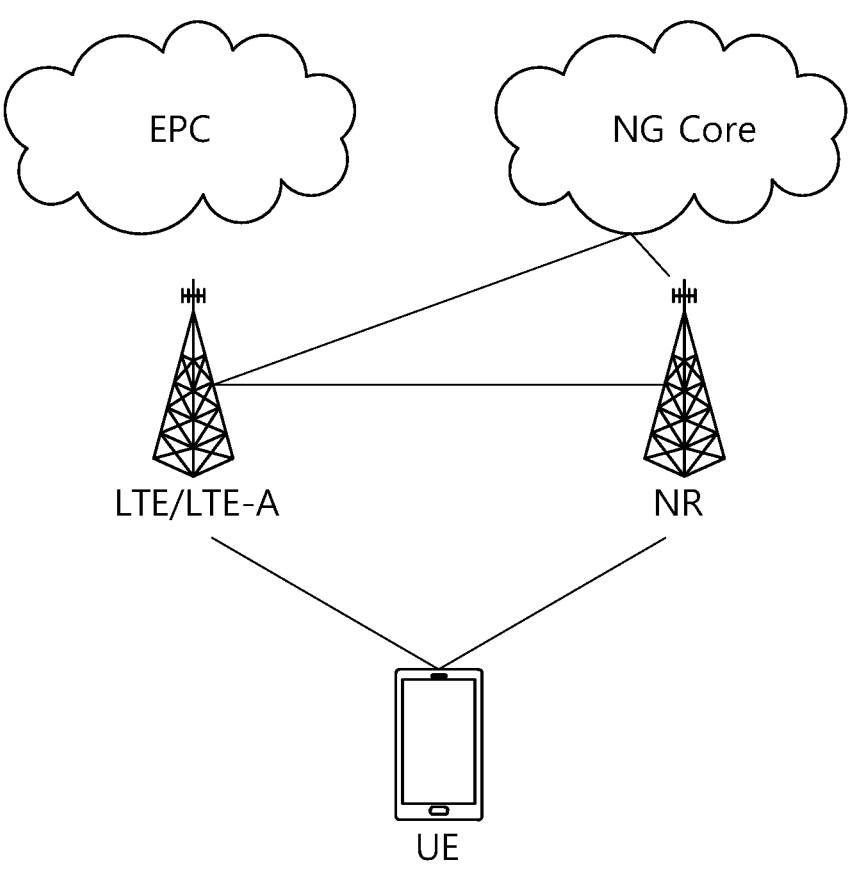
Figure 5C:
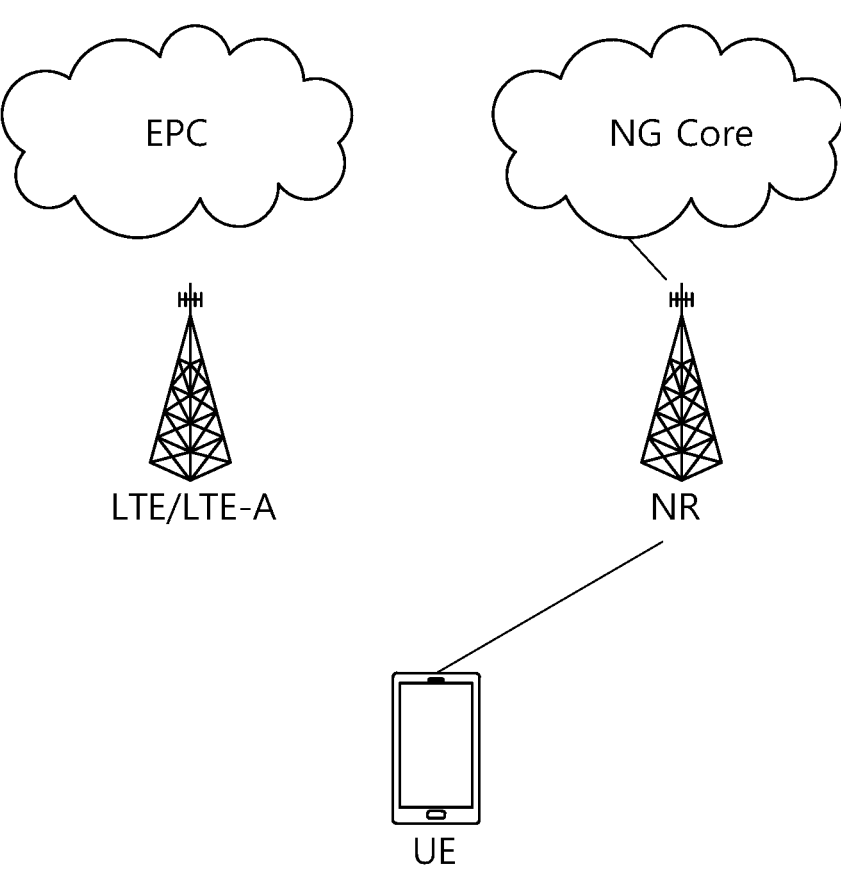

FIGS. 5a to 5c are exemplary diagrams illustrating an exemplary architecture for a service of next-generation mobile communication.

Referring to FIG. 5a, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 5b, unlike FIG. 6a, an LTE/LTE-A-based cell is connected to a core network for 5G mobile communication, that is, the LTE/LTE-A-based cell is connected to a Next Generation (NG) core network.

A service method based on the architecture shown in FIG. 5a and FIG. 5b is referred to as NSA (non-standalone).

Referring to FIG. 5c, UE is connected only to an NR-based cell. A service method based on this architecture is called SA (standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 6:
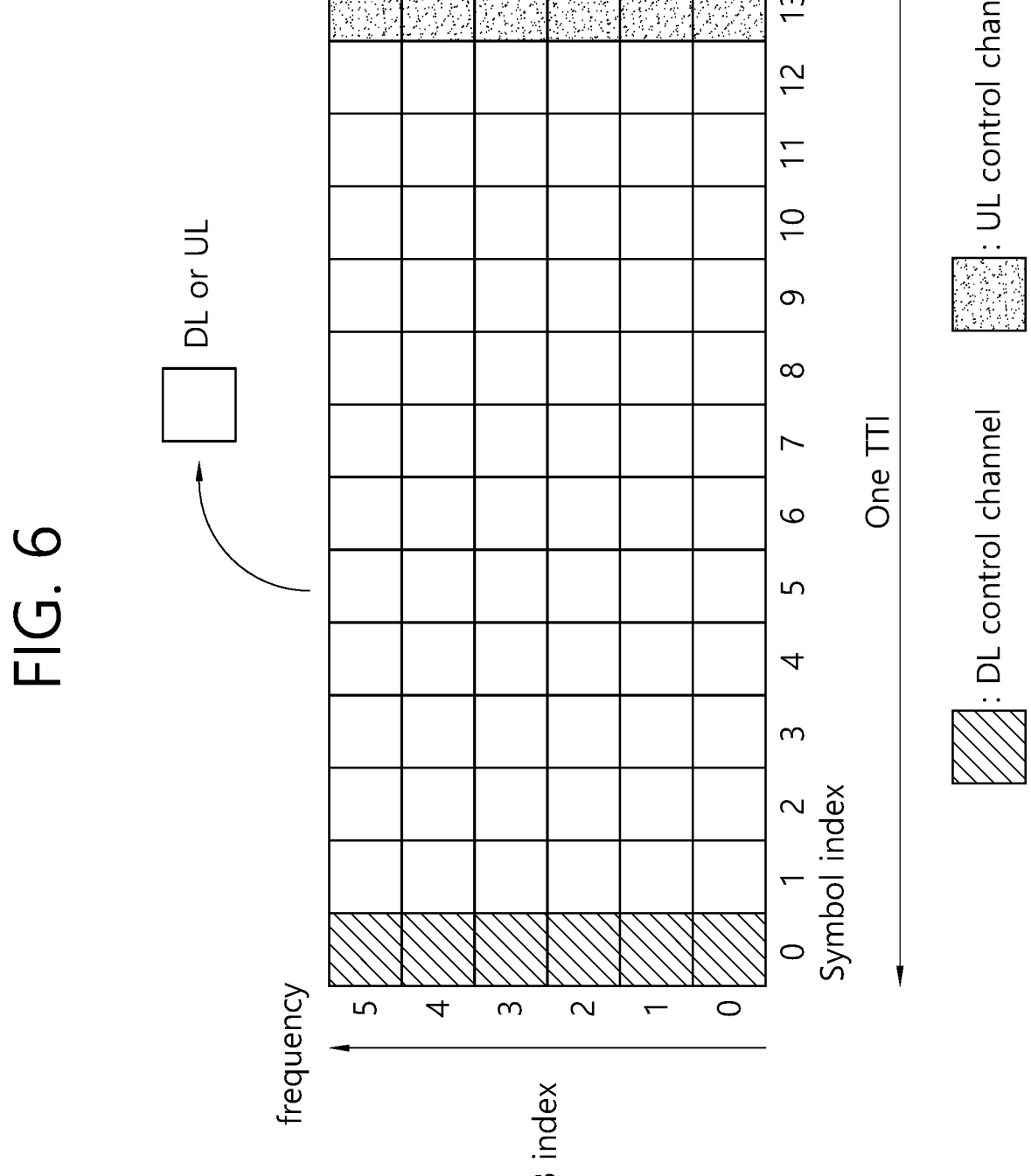
FIG. 6 shows an example of subframe types in NR.

FIG. 6 shows an example of subframe types in NR.

The TTI (transmission time interval) shown in FIG. 6 may be referred to as a subframe or a slot for NR (or new RAT).

The subframe (or slot) of FIG. 6 may be used in a TDD system of NR (or new RAT) to minimize data transmission delay. As shown in FIG. 6, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot). The structure of such a subframe (or slot) may be referred to as a self-contained subframe (or slot). When the structure of such subframe (or slot) is used, the time it takes to retransmit data in which a reception error occurs is reduced, so that the final data transmission latency can be minimized. In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

\<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by $\mu$, a subcarrier spacing and a corresponding CP length may be expressed as shown in the following table.

TABLE 3

| M | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by $\mu$, the number of OLDM symbols per slot ($N^{slot}_{symb}$), the number of slots per frame ($N^{frame,\mu}_{slot}$), and the number of slots per subframe ($N^{subframe,\mu}_{slot}$) are expressed as shown in the following table.

TABLE 4

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by u, the number of OLDM symbols per slot ($N^{slot}_{symb}$), the number of slots per frame ($N^{frame,\mu}_{slot}$), and the number of slots per subframe ($N^{subframe,\mu}_{slot}$) are expressed as shown in the following table.

15

TABLE 5

| M | $N^{slot}_{symb}$ | $N^{frame,\mu}_{slot}$ | $N^{subframe,\mu}_{slot}$ |
|---|---|---|---|
| 2 | 12 | 40 | 4 |

16

Meanwhile, in next-generation mobile communication, each symbol within a symbol may be used as a downlink or an uplink as shown in the table below. In the table below, uplink is denoted by U, and downlink is denoted by D. In the table below, X represents a symbol that can be flexibly used in uplink or downlink.

TABLE 6

| format | \multicolumn{14}{c}{Symbol number in a slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |

<NR to SS Block>

SS block (SS/PBCH block: SSB) include information necessary for the terminal to perform initial access in 5G NR, that is, a physical broadcast channel (PBCH) including a master information block (MIB) and a synchronization signal (Synchronization Signal: SS) (PSS and SSS).

In addition, a plurality of SSBs may be bundled to define an SS burst, and a plurality of SS bursts may be bundled to define an SS burst set. It is assumed that each SSB is beamformed in a specific direction, and several SSBs in the SS burst set are designed to support terminals existing in different directions, respectively.

Figure 7:
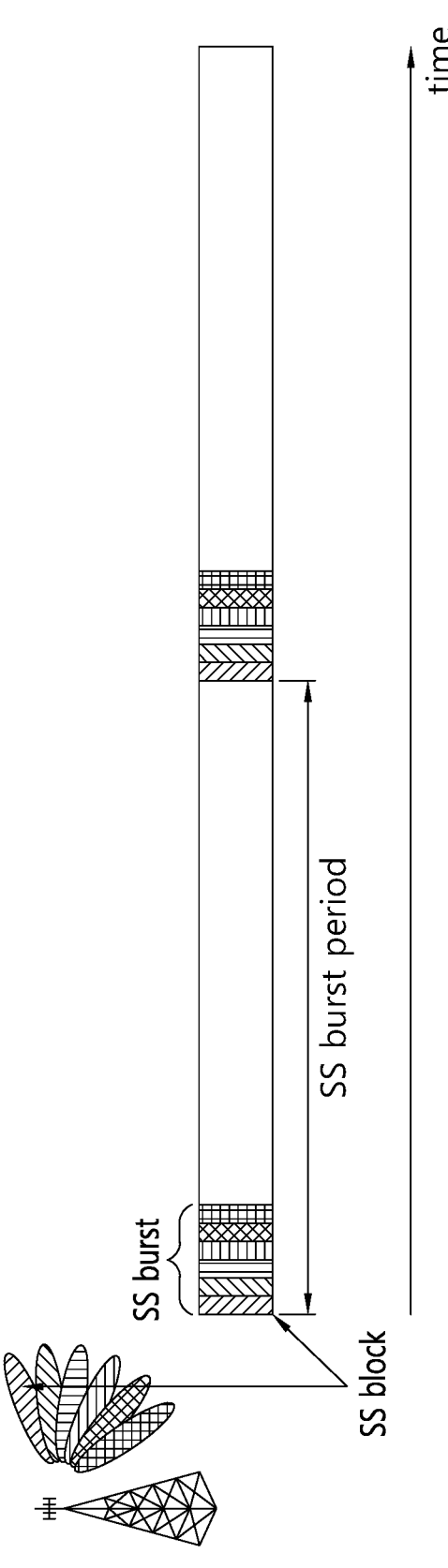
FIG. 7 is an exemplary diagram illustrating an example of an SS block in NR.

FIG. 7 is an exemplary diagram illustrating an example of an SS block in NR.

Referring to FIG. 7, the SS burst is transmitted every predetermined period. Accordingly, the terminal receives the SS block, and performs cell detection and measurement.

Meanwhile, in 5G NR, beam sweeping is performed for SS. This will be described with reference to FIG. 8.

Figure 8:
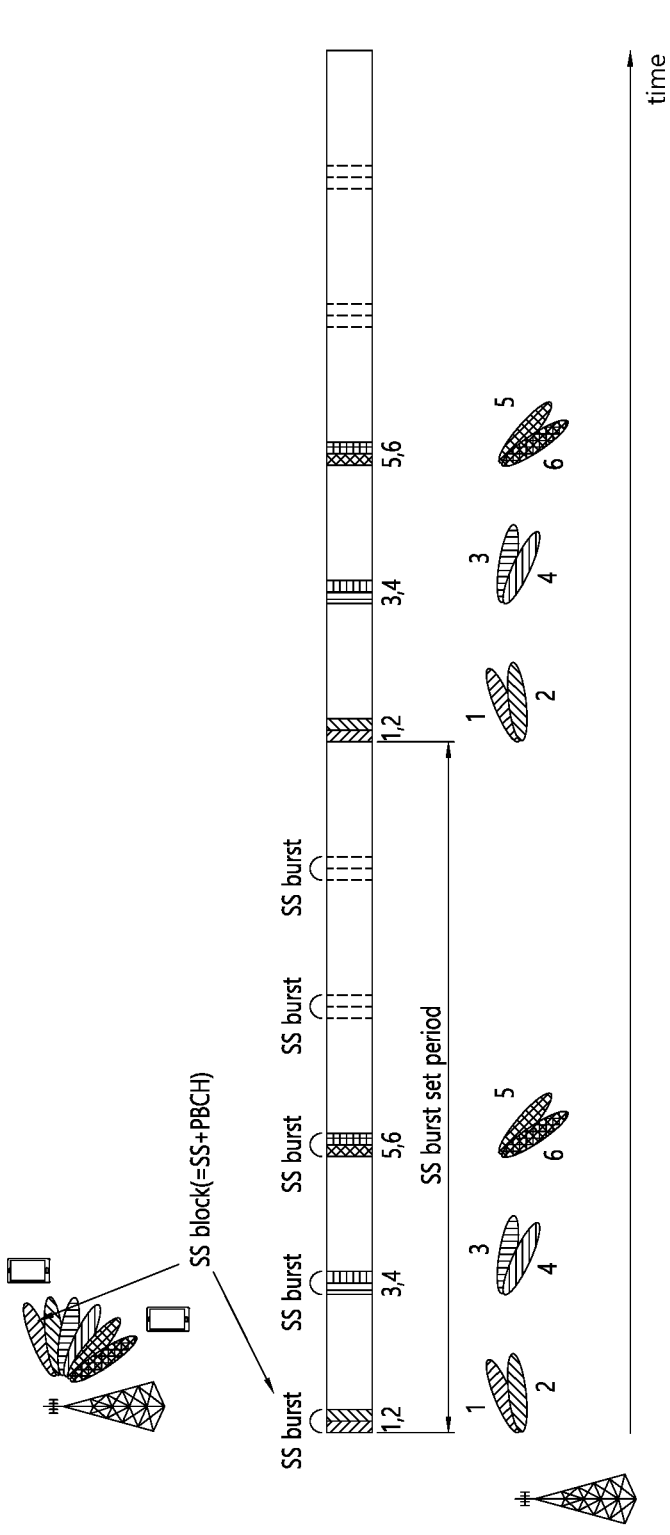
FIG. 8 is an exemplary diagram illustrating an example of beam sweeping in NR.

FIG. 8 is an exemplary diagram illustrating an example of beam sweeping in NR.

The base station transmits each SS block in the SS burst while performing beam sweeping according to time. In this case, several SS blocks in the SS burst set are transmitted to support terminals existing in different directions, respectively.

<Non-Terrestrial Networks>

A non-terrestrial network refers to a network, or segment of networks using RF resources on board a satellite (or UAS platform).

A Feeder link or radio link between a sat-gateway and the satellite (or UAS platform)

A service link or radio link between the user equipment and the satellite (or UAS platform).

A satellite (or UAS platform) which may implement either a transparent or a regenerative (with on board processing) payload. The satellite (or UAS platform) generates beams typically generate several beams over a given service area bounded by its field of view. The footprints of the beams are typically of elliptic shape. The field of view of a satellite (or UAS platforms) depends on the on-board antenna diagram and min elevation angle.

A transparent payload: Radio Frequency filtering, Frequency conversion and amplification. Hence, the waveform signal repeated by the payload is unchanged;

A regenerative payload: Radio Frequency filtering, Frequency conversion and amplification as well as demodulation/decoding, switch and/or routing, coding/modulation. This is effectively equivalent to having all or part of base station functions (e.g., gNB) on board the satellite (or UAS platform).

Inter-satellite links (ISL) optionally in case of a constellation of satellites. This will require regenerative payloads on board the satellites. ISL may operate in RF frequency or optical bands.

User Equipment are served by the satellite (or UAS platform) within the targeted service area.

Table 7 shows the types of NTNs.

TABLE 7

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth with respect to | 200-3500 km |
| UAS platform (including HAPS) | 8-50 km (20 km for HAPS) | a given earth point | 5-200 km |
| High Elliptical Orbit (HEO) satellite | 400-50000 km | Elliptical around the earth | 200-3500 km |

There are two common scenarios of NTN providing access to user equipment: transparent payload and regenerative payload.

NTNs are typically characterized by the following elements:

One or several sat-gateways that connect the Non-Terrestrial Network to a public data network A GEO satellite is fed by one or several sat-gateways which are deployed across the satellite targeted coverage (e.g., regional or even continental coverage). We assume that UE in a cell is served by only one sat-gateway A Non-GEO satellite served successively by one or several sat-gateways at a time. The system ensures service and feeder link continuity between the successive serving sat-gateways with sufficient time duration to proceed with mobility anchoring and hand-over Typically, GEO satellite and UAS are used to provide continental, regional or local service. Typically, a constellation of LEO and MEO is used to provide services in both Northern and Southern hemispheres. In some case, the constellation can even provide global coverage including polar regions. For the later, this requires appropriate orbit inclination, sufficient beams generated and inter-satellite links.

<Non-Terrestrial Networks>

Figure 9:
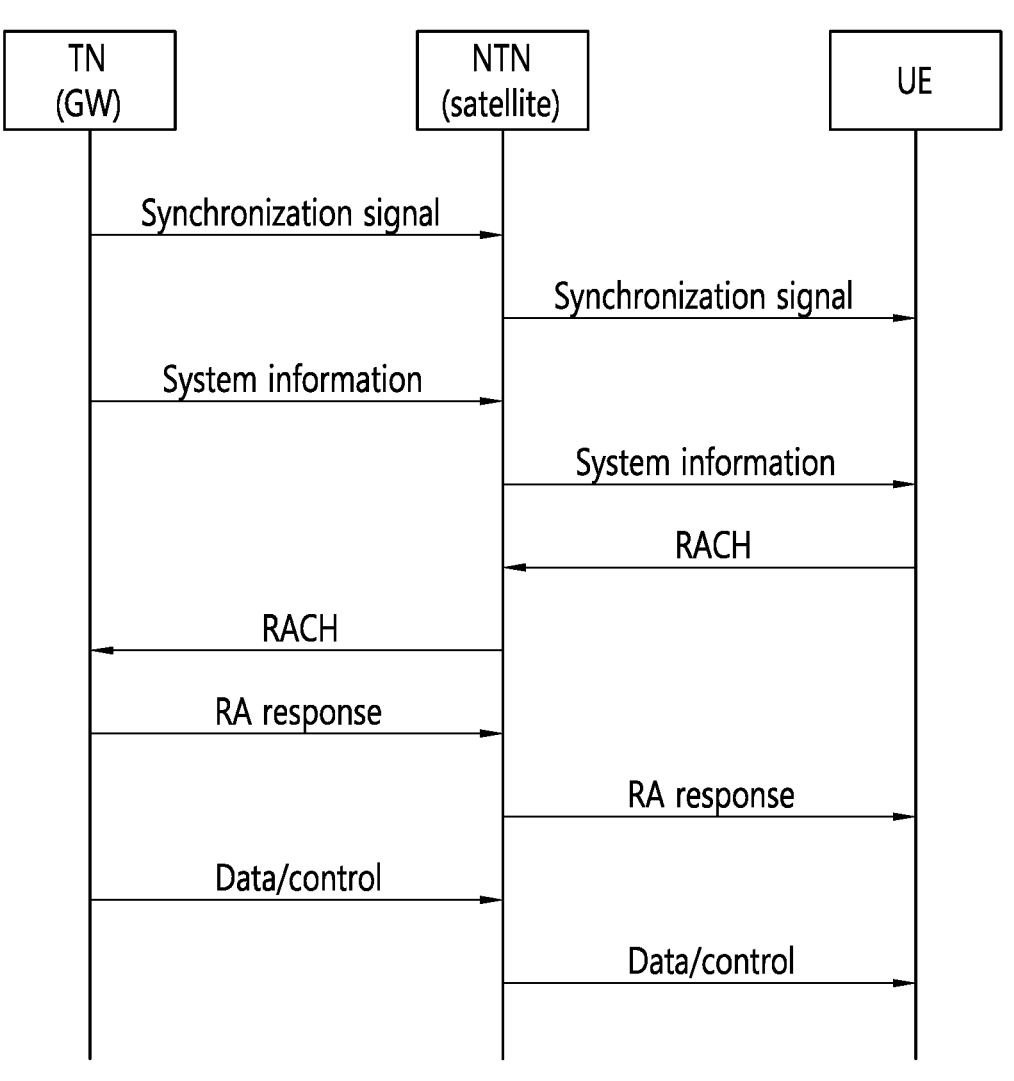
FIG. 9 shows an example of an initial access procedure for NTN communication according to an embodiment of the disclosure of the present specification.

FIG. 9 shows an example of an initial access procedure for NTN communication according to an embodiment of the disclosure of the present specification.

In the example of FIG. 9, TN (GW) means an NTN base station. NTN (satellite) means NTN satellite.

TN (GW) may transmit a synchronization signal to the NTN satellite, and the NTN satellite may transmit a synchronization signal to the UE.

TN (GW) may transmit system information to the NTN satellite, and the NTN satellite may transmit system information to the UE.

For reference, system information may be specifically obtained as in the following example.

Acquisition of system information (SI) is described.

System information (SI) is divided into MasterInformationBlock (MIB) and multiple SystemInformationBlocks (SIBs). here, MIB has a period of 80 ms, is always transmitted on the BCH, is repeated within 80 ms, and includes the parameters necessary to obtain SystemInformationBlockType1 (SIB1) from the cell;

SIB1 is transmitted with periodicity and repetition on DL-SCH. SIB1 contains information about the availability and scheduling (e.g., periodicity, SI-window size) of other SIBs. It also indicates whether these (i.e. other SIBs) are provided on a periodic broadcast basis or on demand. If other SIBs are provided on demand, SIB1 contains information for the terminal to perform the SI request;

SIBs other than SIB1 are carried in a SystemInformation (SI) message transmitted on the DL-SCH. Each SI message is transmitted within a periodically occurring time domain window (called SI-window).

In the example of FIG. 9, the system information may include information about satellite ephemeris information, common TA-related parameter information, and the validity duration of the relevant information or UL synchronization information.

The UE may transmit RACH (Random Access Channel) to TN (GW), and TN (GW) may transmit RACH to the NTN satellite. The UE may transmit an initial control message through RACH.

TN(GW) may transmit a Random Access (RA) response message to the NTN satellite, and the NTN satellite may transmit an RA response message to the UE.

After the RA response message is transmitted, the TN (GW) may transmit data and/or control signals to the NTN satellite, and the NTN satellite may transmit data and/or control signals to the UE.

<Problems to be Solved in the Disclosure of this Specification>

Figure 10:
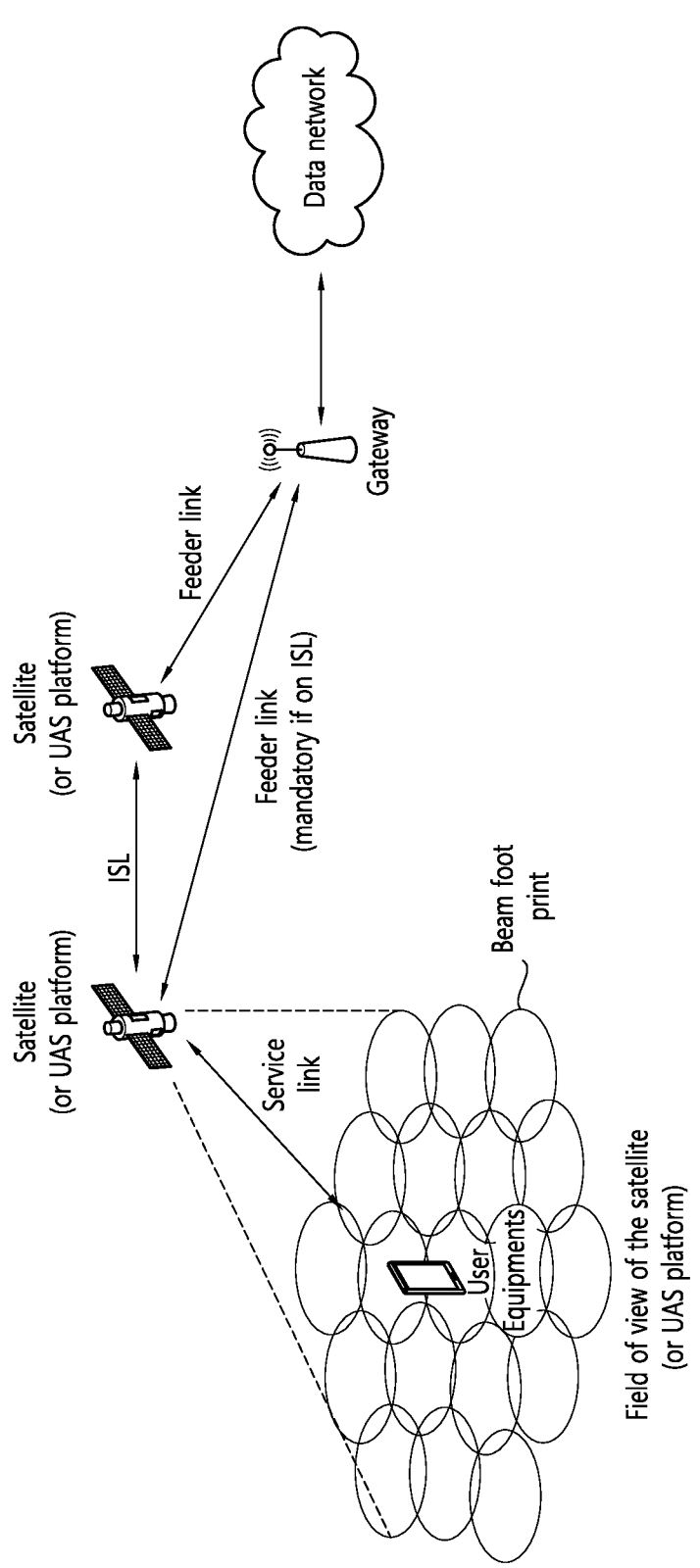
FIG. 10 is an exemplary diagram illustrating an example of an NTN.

FIG. 10 is an exemplary diagram illustrating an example of an NTN.

NR-based NTN (non-terrestrial network) communication was introduced as a method for efficiently providing communication services to areas where terrestrial network services are not provided through satellites (geostationary satellite GEO, low-orbit satellite LEO, etc.) as shown in FIG. 10. In the case of a transparent satellite, the satellite amplifies the signal transmitted from the terrestrial base station (gNB-NTN gateway). And in the case of a regenerative satellite, the satellite performs function of terrestrial base station such as routing, coding and decoding modulation. An NTN terminal as a GPS function and periodically receives location, time, and speed information for NTN satellites.

Figure 11:
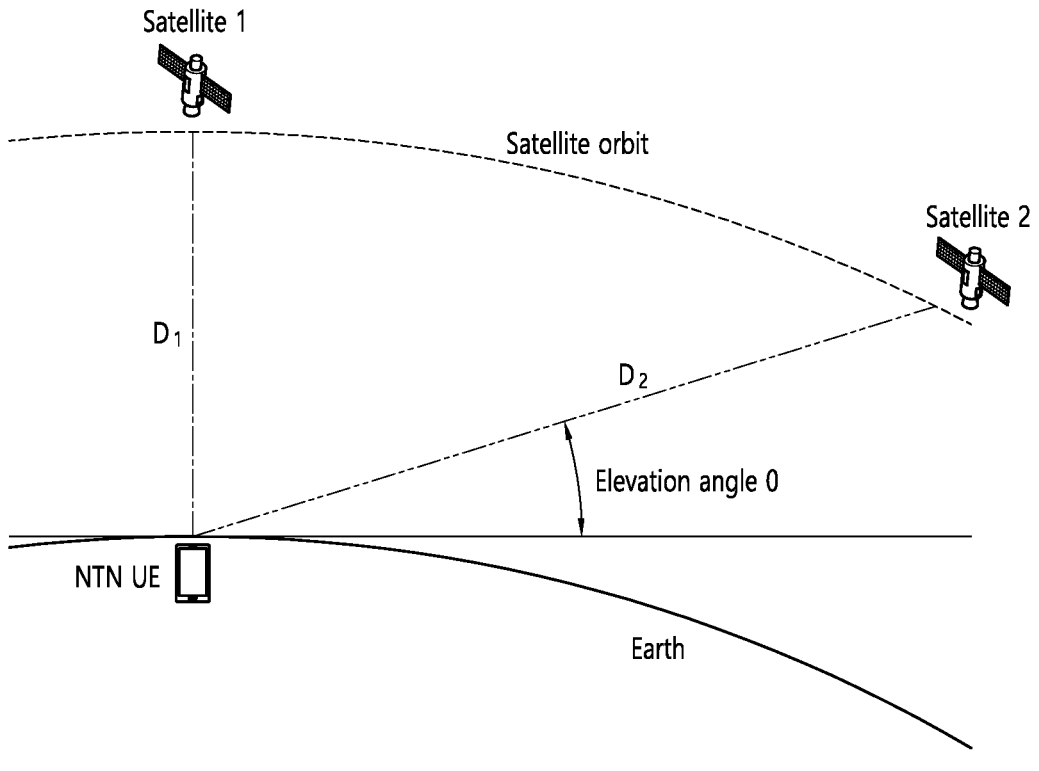
FIG. 11 shows an example of satellite elevation angle.

FIG. 11 shows an example of satellite elevation angle.

FIG. 11 shows the satellite elevation angle of the target satellite (Satellite 2). The terminal may need to measure the signal of the target satellite (Satellite 2). At this time, the network may configure, to the terminal, SMTC (SSB Measurement Time Configuration) or MG (Measurement Gap) to measure signals from satellites adjacent to or expected to be adjacent. The terminal may measure the signal of the target satellite using SMTC or MG.

Typically, when the elevation angle of the target satellite is 10 degrees or more, the terminal may measure the signal of the target satellite.

If the target satellite is on or below the horizon or the elevation angle of the target satellite is less than a certain angle (for example, 10 degrees), the terminal may not be able to measure the target satellite's signal.

However, if the SMTC or MG is configured without considering the altitude angle of the target satellite, a problem may occur in which the terminal cannot measure the signal of the target satellite.

<Disclosure of the Present Specification>

The disclosures described later in the present specification may be implemented in one or more combinations (e.g., a combination including at least one of the contents described below). Each of the drawings represents an embodiment of each disclosure, but the embodiments of the drawings may also be implemented in combination with each other.

The description of the method proposed in the disclosure of this specification may consist of a combination of one or more operations/configurations/steps described below. The methods described below can be performed or used in combination or complementary.

5G NR NTN (non-terrestrial network) was introduced to provide communication services using satellites/aircraft, etc. in the coverage hole of the existing terrestrial network (TN). Satellites/aircraft include transparent satellites/aircraft that perform simple signal amplification like repeaters in existing TNs, and regenerative satellites/aircraft that can perform the role of a ground base station. Although this specification assumes that a satellite is especially a transparent satellite, this specification may also be applied to regenerative satellites or air vehicles.

A terminal receiving service from an NTN may need to measure the reference signal of an adjacent satellite as the satellite moves or the terminal moves. At this time, the network must configure SMTC (SSB Measurement Time Configuration) or MG (Measurement Gap) to measure signals from satellites that are adjacent or expected to be adjacent to the terminal. However, depending on the type of information used (location of the terminal, delay) or subject (network or terminal), the starting point of SMTC/MG and the operation process of the terminal related SMTC/MG may vary.

In this specification, the specification propose terminal and network operations that can be used to prevent performance degradation, reduce complexity, and save power when the terminal needs to measure signals from surrounding satellites/beams. Before explaining the specific details, it is noted that in 5G NR NTN operation, the terminal's location information and satellite's orbital information using GNSS may be used, and the terminal may use the target satellite's orbital information to calculate delay and distance. In addition, for convenience, this specification explains when specific information (for example, the location of the terminal) can be used and when it cannot be used, as case 1, case 2, and case 3 below. However, the case below may be a series of operation processes depending on the reporting capability of the terminal, or may be an independent operation depending on future standards. In other words, each case is an independent environment depending on the terminal and network conditions and settings, and the proposed method may also be applied independently.

1. Case 1

Case 1 is a case where the terminal reports only delay information (delay difference between the current serving satellite and the target satellite or delay difference between the target satellite and the terminal) to the network or the network does not accurately know the starting point of SMTC/MG.

In this case, because the network must configure the start point of SMTC/MG using only the terminal's delay information, it may not be possible to configure the exact time point. For example, in FIG. 10, when the elevation angle for satellite 2 is typically 10 degrees or more, the terminal can measure the satellite's signal. However, when the SMTC/MG point is configured considering only delay information, the satellite may be below the horizon or the elevation angle of the satellite may be less than 10 degrees, so the terminal cannot measure signal from the satellite.

The above-mentioned altitude angle of 10 degrees refers to the minimum altitude angle threshold at which the terminal can measure the target satellite, and the altitude angle of 10 degrees is for an example and the minimum altitude angle threshold is not limited to 10 degrees. This applies not only to this case 1 but also to cases 2-4 described later.

If the network configure SMTC/MG at a time when satellite measurement is impossible, the terminal cannot measure the target satellite's signal or receive data from the serving satellite, therefore, performance degradation may occur or the terminal may try to perform meaningless SSB reception. To prevent this problem, the terminal may attempt each of the following operations.

(1) Embodiment 1

The terminal directly calculates the measurement point (for example, the point where the altitude angle is 10 degrees) using the satellite's orbit information and attempts measurement. If the SMTC/MG or section notified by the network is earlier than the measurement point, the terminal may report a message indicating that measurement at that point is impossible or has failed. Additionally, if measurement fails after attempting measurement at a directly calculated measurement point, the operation of Embodiment 2 or 3 may be performed.

(2) Embodiment 2

The terminal attempts to measure the satellite at the point in time notified by the network (when SMTC/MG is configured or at a specific point in time notified by the network), and if measurement for the satellite fails, the terminal may report to the network and request to reconfigure the SMTC/MG.

(3) Embodiment 3

The terminal attempts to measure at the point, and if the measurement fails, the terminal may attempt to measure the satellite at a specific period instead of every MG/SMTC. At this time, the specific period may be adjusted to be more quick or slow; like exponential back off. Additionally, it may be adjusted to a fixed period longer than the SMTC/MG period. This process may be schematized as shown in FIG. 11. The terminal may report a message notifying that the measurement for the MG/SMTC point was skipped, a message reporting that the measurement failed, and a message indicating that the measurement period will be adjusted in the future.

(4) Embodiment 4

If the signal strength in the SMTC/MG duration reported by the terminal is below a certain threshold or the network does not received the report from the terminal, the network determines that the terminal cannot see the satellite well or is unable to see it and increases the SMTC/MG period.

The above-described embodiments 1, 2, and 3 are independent operations rather than a series of sequential operations, and can be operated in combination.

The following drawings were prepared to explain a specific example of the present specification. Since the names of specific devices or specific signals/messages/fields described in the drawings are provided as examples, the technical features of this specification are not limited to the specific names used in the drawings below.

FIG. 12 shows an example of Case 1.

If the network fails to configure the correct SMTC/MG starting point, operations i), ii), or iii) below may be initiated.

i) The terminal may independently determine the measurement point (time) for the target satellite using the satellite's orbit information. The terminal may repeatedly determine the measurement point for the target satellite at specific periods configured by the network.

ii) If the measurement fails after attempting to measure the target satellite, the terminal may report the failure to the network and request reconfiguration of SMTC or MG.

iii) After attempting measurement on the target satellite, the terminal may adjust the measurement period if measurement fails. The terminal may attempt measurement at specific periods configured by the network, and if measurement fails, the terminal may adjust the measurement period.

If the network fails to configure the correct SMTC/MG starting point, the operation may be terminated.

2. Case 2

Case 2 is when the terminal reports location information of the terminal to the network or when the network knows the location of the terminal, this is a case where the network can calculate the point (for example, when the altitude angle of the target satellite reaches the threshold, e.g., 10 degrees) in time when a satellite is visible to the terminal based on the location of the terminal (for example, calculation considering a specific point in the current service satellite area and the location of the target satellite).

(1) Embodiment 5

In this case, the network may configure SMTC/MG for the terminal after calculating the starting point of SMTC/MG considering the locations of all terminals and satellites. The starting point may be, for example, the time considering the time when the target satellite reaches a point where the altitude angle becomes a threshold value (for example, 10 degrees) and delay.

Alternatively, because excessive load may occur on the network, the network may calculate the starting point of SMTC/MG for only terminals (terminals judged to be at the edge of the service area) whose signal strength of the serving cell (satellite) is below a certain threshold, and then provide the starting point of SMTC/MG to the terminals.

Alternatively, the network may calculate the location of a specific or random point at the edge of the service area and the location of the satellite, and inform valid start point of SMTC to the only terminal located in the corresponding area (cell).

FIG. 13 shows an example of Case 2.

When the network directly uses the location information of the terminal, operations to be described later may be initiated.

The starting point of SMTC or MG may be configured by considering the locations of all terminals (or terminals whose signal strength of the serving satellite is below a certain threshold) and the locations of the satellite.

The operation may be terminated when the network directly uses the location information of the terminal.

3. Case 3

Case 3 is a case where the terminal reports delay information and the time at which it is predicted that measurement of the target satellite will be possible. The time at which it is predicted that measurement of the target satellite will be possible may be when the target satellite reaches a point where the altitude angle becomes a threshold (for example, 10 degrees), and the terminal may start SMTC/MG from that point.

(1) Embodiment 6

The terminal may use the satellite orbit information provided by the network to calculate and report the time when measurement is possible. The terminal may report, to the network, 'Measurement_report' including information such {cellID=x. satelliteID=x2. Measurement_time=[y] ms}. In this way, the terminal may report that measurement of the target satellite is possible after a specific time (Measurement_time).

Alternatively, the terminal may report absolute time based on UTC (Coordinated Universal Time/Universal Time Coordinated) instead of the specific time.

Figure 14:
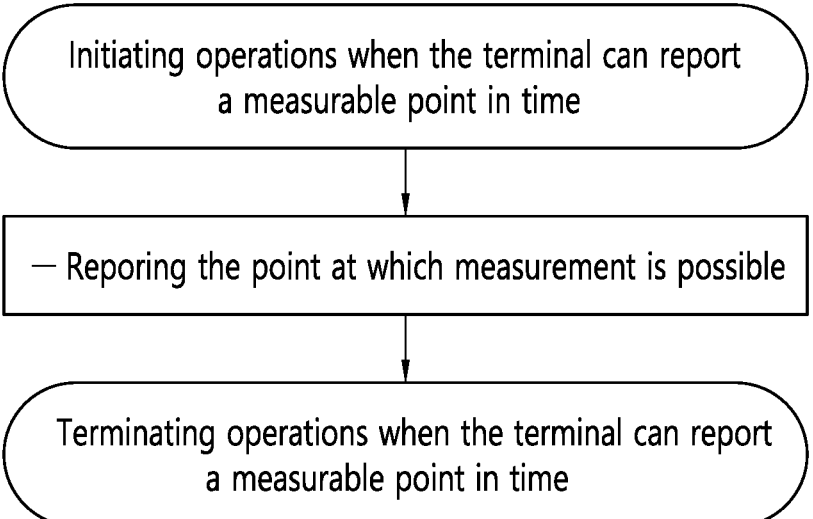
FIG. 14 shows an example of Case 3.

FIG. 14 shows an example of Case 3.

When the terminal can report a measurable point in time, the following operations may be initiated.

The terminal may report the point at which measurement is possible to the network.

The operation may be terminated when the terminal can report the point in time at which measurement is possible.

4. Case 4

Case 4 is a case where the terminal calculates the measurement time at which the terminal is expected to be able to measure the target satellite (for example, the time when the satellite reaches the point where the altitude angle of the satellite becomes a threshold value, e.g., 10 degrees) and reports, to the network, delay difference information about the target satellite in consideration of the measurement time.

(1) Embodiment 7

The terminal may use the satellite's orbital information provided by the network to calculate the measurable point (for example, when the satellite reaches the point where the altitude angle of the satellite becomes a threshold value, for example, 10 degrees).

In order for the network to configure SMTC/MG, information such as the delay difference between the satellite and the terminal reported by the terminal may be required.

The terminal may report to the network the delay difference for satellites that have reached or are close to the calculated measurable point.

Alternatively, the terminal may report delay differences to the network only for nearby satellites that can be measured based on the calculated measurable time point.

Reporting by the terminal may be performed upon request from the network. Alternatively, the terminal may periodically report to the network. The terminal may calculate the delay difference using ephemeris information of satellites included in system information such as SIB and report the delay difference to the network. The terminal may calculate the elevation angle and delay difference of the satellites using the ephemeris information of the satellites and the terminal's location derived through GNSS (Global Navigation Satellite System). Additionally, ephemeris information of the satellite includes information on the position where the satellite will move in the future, making it possible to predict how the satellite's elevation angle and delay difference will change in the future.

In other words, the network may be reported, from the terminal, a delay difference only for measurable satellites, and use the delay difference to configure SMTC or MG in the terminal only for measurable satellites.

If a satellite reaches a location where the terminal can measure the satellite's signal, the terminal may report the delay difference to the network. That is, the terminal calculates the measurable time at which measurement of the target satellite is predicted to be possible, and the terminal may report the delay difference to the network at the measurable time. Under the trigger condition of the target satellite arriving at a measurable location, the terminal may report the delay difference to the network. Case 3 is a case where the terminal reports the measurable time to the network, while Case 4 is a case where the terminal reports the delay difference to the network at the measurable time.

If the network does not receive a report on the delay difference from the terminal for a specific satellite, the network may recognize that measurement for the satellite is not possible immediately and instruct the terminal to report the delay difference for surrounding satellites, including the specific satellite, after a certain time.

The Case 1 to the Case 4 do not specify the mode of the terminal. The above operations may be applied regardless of the terminal mode.

Examples of specific implementations of the present specification based on the terminal mode may be as follows.

For example, in Case 1, when the terminal is in idle mode or inactive mode, based on ephemeris information from satellites provided through SIB and the location of the terminal acquired through the terminal's GNSS, the terminal may determine the SMTC or MG measurement time and attempt measurement. At this time, an operation may be performed to adjust the measurement timing to be periodic or aperiodic.

For example, in case 4, when the terminal is in connected mode, the network may request, to the terminal, delay information between the terminal and surrounding satellites to configure SMTC or MG. The terminal may calculate the delay difference and elevation angle with surrounding satellites based on the ephemeris information of the satellites provided through SIB and the terminal's location acquired through the terminal's GNSS. At this time, the terminal may report delay information to the network only for satellites whose elevation angles are located above a certain angle.

Figure 15:
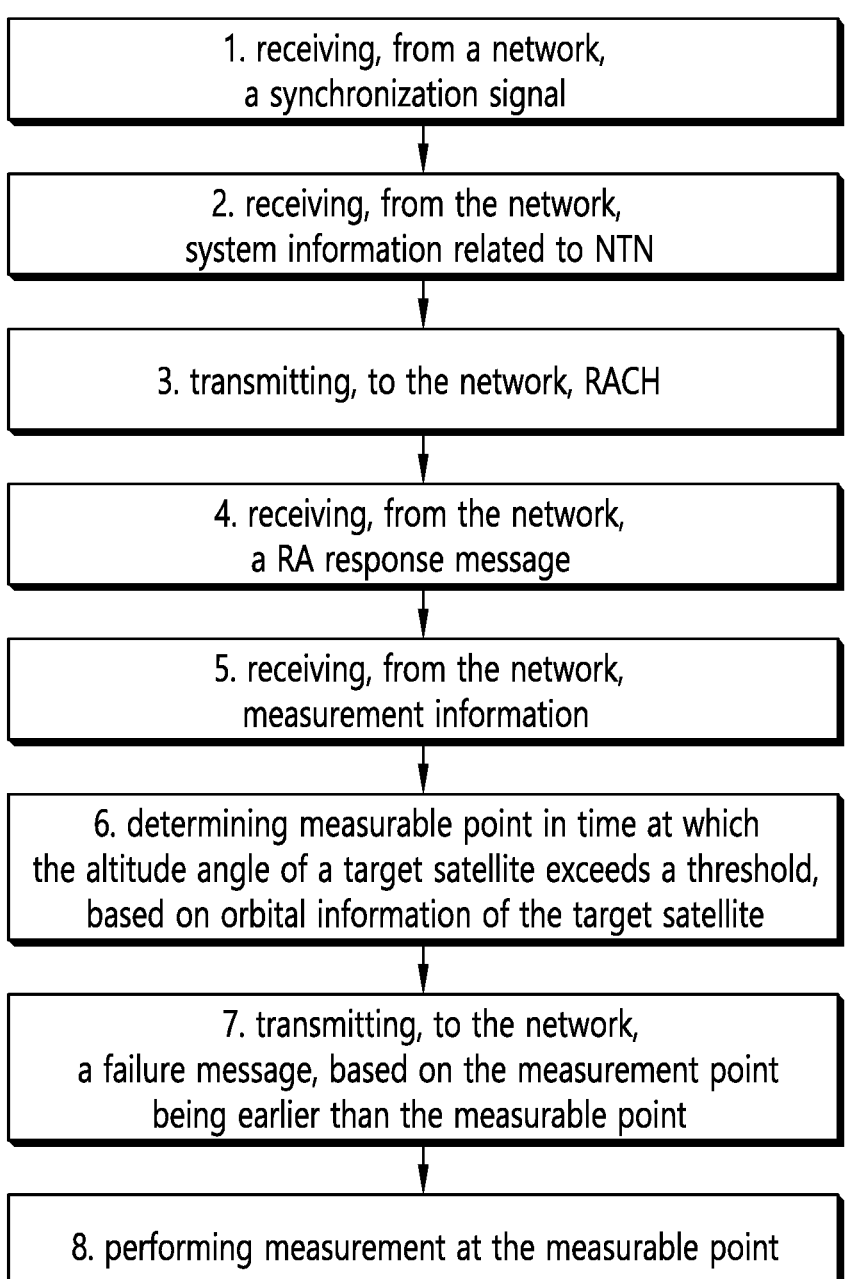
FIG. 15 shows the procedure of the UE according to the disclosure of the present specification.

FIG. 15 shows the procedure of the UE according to the disclosure of the present specification.

1. The UE may receive, from a network, a synchronization signal.

2. The UE may receive, from the network, system information related to NTN, based on the UE connecting to the network via a NTN satellite.

3. The UE may transmit, to the network, RACH (Random Access Channel).

4. The UE may receive, from the network, a RA (Random Access) response message.

5. The UE may receive, from the network, measurement information.

The measurement information may include information on measurement point for the UE's measurement.

6. The UE may determine measurable point in time at which the altitude angle of a target satellite exceeds a threshold, based on orbital information of the target satellite.

7. The UE may transmit, to the network, a failure message, based on the measurement point being earlier than the measurable point.

8. The UE may perform measurement at the measurable point.

The measurement information may include information on SMTC (SSB Measurement Timing Configuration) or MG (Measurement Gap).

The measurement information may include information on measurement period for the UE's measurement.

The UE may adjust the measurement period, based on the UE failing the measurement at the measurable point.

The UE may report, to the network, adjustment of the measurement period.

The threshold may be 10 degrees.

Hereinafter, a device for providing mobile communication according to some embodiments of the present specification will be described.

For example, the device may include a processor, transceiver, and memory.

For example, a processor may be configured to be operably coupled with a memory and the processor.

The processor performs operation, which is comprising: receiving, from a network, a synchronization signal; receiving, from the network, system information related to NTN, based on the UE connecting to the network via a NTN satellite; transmitting, to the network, RACH (Random Access Channel); receiving, from the network, a RA (Random Access) response message; receiving, from the network, measurement information, wherein the measurement information includes information on measurement point for the UE's measurement; determining measurable point in time at which the altitude angle of a target satellite exceeds a threshold, based on orbital information of the target satellite; transmitting, to the network, a failure message, based on the measurement point being earlier than the measurable point; and performing measurement at the measurable point.

Hereinafter, a processor for providing NTN (Non-Terrestrial Networks) communication in wireless communication system according to some embodiments of the present specification will be described.

The processor performs operation, which is comprising: receiving, from a network, a synchronization signal; receiving, from the network, system information related to NTN, based on the UE connecting to the network via a NTN satellite; transmitting, to the network, RACH (Random Access Channel); receiving, from the network, a RA (Random Access) response message; receiving, from the network, measurement information, wherein the measurement information includes information on measurement point for the UE's measurement; determining measurable point in time at which the altitude angle of a target satellite exceeds a threshold, based on orbital information of the target satellite; transmitting, to the network, a failure message, based on the measurement point being earlier than the measurable point; and performing measurement at the measurable point.

Hereinafter, a non-volatile computer-readable medium storing one or more instructions for providing mobile communication m according to some embodiments of the present specification will be described.

According to some embodiments of the present disclosure, the technical features of the present disclosure may be directly implemented as hardware, software executed by a processor, or a combination of the two. For example, in wireless communication, a method performed by a wireless device may be implemented in hardware, software, firmware, or any combination thereof. For example, the software may reside in RAM memory, flash memory, ROM memory, EPROM memory, EEPROM memory, registers, hard disk, removable disk, CD-ROM, or other storage medium.

Some examples of a storage medium are coupled to the processor such that the processor can read information from the storage medium. Alternatively, the storage medium may be integrated into the processor. The processor and storage medium may reside in the ASIC. For another example, a processor and a storage medium may reside as separate components.

Computer-readable media can include tangible and non-volatile computer-readable storage media.

For example, non-volatile computer-readable media may include random access memory (RAM), such as synchronization dynamic random-access memory (SDRAM), read-only memory (ROM), or non-volatile random-access memory (NVRAM). Read-only memory (EEPROM), flash memory; magnetic or optical data storage media, or other media that can be used to store instructions or data structures. Non-volatile computer readable media may also include combinations of the above.

Further, the methods described herein may be realized at least in part by computer-readable communication media that carry or carry code in the form of instructions or data structures, and which can be accessed, read, and/or executed by a computer.

According to some embodiments of the present disclosure, a non-transitory computer-readable medium has one or more instructions stored thereon. The stored one or more instructions may be executed by a processor of the UE.

The stored one or more instructions cause the processor to perform operation, which is comprising: receiving, from a network, a synchronization signal; receiving, from the network, system information related to NTN, based on the UE connecting to the network via a NTN satellite; transmitting, to the network, RACH (Random Access Channel): receiving, from the network, a RA (Random Access) response message; receiving, from the network, measurement information, wherein the measurement information includes information on measurement point for the UE's measurement; determining measurable point in time at which the altitude angle of a target satellite exceeds a threshold, based on orbital information of the target satellite; transmitting, to the network, a failure message, based on the measurement point being earlier than the measurable point; and performing measurement at the measurable point.

The specification may have various effects.

For example, through the procedure disclosed in this specification, it is possible to efficiently measure the target satellite using elevation angle information, thereby preventing a decrease in system performance and saving terminal power.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

The claims described herein may be combined in various ways. For example, the technical feature of the method claims of the present specification may be combined and implemented as an apparatus, and the technical features of the apparatus claims of the present specification may be combined and implemented as a method. In addition, the technical feature of the method claims of the present specification and the technical features of the apparatus claims may be combined to be implemented as an apparatus, and the technical feature of the method claims and the technical features of the apparatus claims of the present specification may be combined and implemented as a method. Other implementations are within the scope of the following claims.

What is claimed is:

1. A method, comprising:
receiving, by a user equipment (UE) from a network, a synchronization signal;
receiving, by the UE from the network, system information related to NTN, based on the UE connecting to the network via a non-terrestrial networks (NTN) satellite;
transmitting, by the UE to the network, a random access preamble;
based on that the random access preamble is transmitted, receiving, by the UE from the network, a random access response;
receiving, by the UE from the network, measurement information; and
receiving, by the UE from the network, orbital information of a target satellite,
wherein the measurement information includes information related to measurement time point for a measurement of the UE;
based on the received orbital information of the target satellite, determining, by the UE, a measurable time point at which an altitude angle of the target satellite calculated from the received orbital information of the target satellite is greater than a threshold;
based on that the measurement time point is earlier than the measurable time point, transmitting, by the UE to the network, a failure message; and
performing, by the UE, measurement at the measurable time point.

2. The method of claim 1,
wherein the measurement information includes information related to synchronization signal block (SSB) measurement timing configuration (SMTC) or measurement gap (MG).

3. The method of claim 1, further comprising:
wherein the measurement information further includes information related to measurement period for the UE's measurement,
adjusting, by the UE, the measurement period, based on the UE failing the measurement at the measurable time point.

4. The method of claim 3, further comprising:
reporting, by the UE to the network, adjustment of the measurement period.

5. The method of claim 1,
wherein the threshold is 10 degrees.

6. A user equipment (UE), comprising:
at least one transceiver;
at least one processor; and
at least one memory connected to the at least one processor and storing instructions that, based on being executed by the at least one processor, cause the UE to perform operations comprising:
receiving, from a network, a synchronization signal;
receiving, from the network, system information related to NTN, based on the UE connecting to the network via a non-terrestrial networks (NTN) satellite;
transmitting, to the network, a random access preamble;
based on that the random access preamble is transmitted, receiving, from the network, a random access response;
receiving, from the network, measurement information; and
receiving, from the network, orbital information of a target satellite,
wherein the measurement information includes information related to measurement time point for a measurement of the UE;
based on the received orbital information of the target satellite, determining a measurable time point at which an altitude angle of the target satellite calculated from the received orbital information of the target satellite is greater than a threshold;
based on that the measurement time point is earlier than the measurable time point, transmitting, by the UE to the network, a failure message; and
performing measurement at the measurable time point.

7. The UE of claim 6,
wherein the measurement information includes information related to synchronization signal block (SSB) measurement timing configuration (SMTC) or measurement gap (MG).

8. The UE of claim 6, further comprising:
wherein the measurement information further includes information related to measurement period for the UE's measurement,
wherein the operations further comprise: adjusting the measurement period, based on the UE failing the measurement at the measurable time point.

9. The UE of claim 8,
wherein the operations further comprise: reporting, to the network, adjustment of the measurement period.

10. The UE of claim 6,
wherein the threshold is 10 degrees.

11. A processing device, comprising:
at least one processor; and
at least one memory connected to the at least one processor and storing instructions that, based on being executed by the at least one processor, cause the processing device to perform operations comprising:
receiving, from a network, a synchronization signal;
receiving, from the network, system information related to NTN, based on the processing device connecting to the network via a non-terrestrial networks (NTN) satellite;
transmitting, to the network, a random access preamble;
based on that the random access preamble is transmitted, receiving, from the network, a random access response;
receiving, from the network, measurement information; and
receiving, from the network, orbital information of a target satellite, wherein the measurement information includes information related to measurement time point a measurement of the processing device;

based on the received orbital information of the target satellite, determining a measurable time point at which an altitude angle of the target satellite calculated from the received orbital information of the target satellite is greater than a threshold;

based on that the measurement time point is earlier than the measurable time point, transmitting, by the processing device to the network, a failure message; and performing measurement at the measurable time point.

* * * * *